(12) United States Patent
Lee et al.

(10) Patent No.: US 8,691,419 B2
(45) Date of Patent: Apr. 8, 2014

(54) CYLINDRICAL SECONDARY BATTERY

(75) Inventors: Myungro Lee, Yongin-si (KR);
Youngcheol Jang, Yongin-si (KR);
Cheolhee Hwang, Yongin-si (KR);
Wanmook Lim, Yongin-si (KR);
Wonchull Han, Yongin-si (KR); Hyorim Bak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/372,996

(22) Filed: Feb. 18, 2009

(65) Prior Publication Data
US 2009/0208826 A1 Aug. 20, 2009

(30) Foreign Application Priority Data
Feb. 20, 2008 (KR) .................. 10-2008-0015267

(51) Int. Cl.
*H01M 8/00* (2006.01)
(52) U.S. Cl.
USPC .............................. 429/137; 429/94; 429/142
(58) Field of Classification Search
USPC ........... 205/628; 429/12, 13, 17, 137, 94, 142
See application file for complete search history.

(56) References Cited

U.S. PATENT DOCUMENTS

| | | | | |
|---|---|---|---|---|
| 5,314,765 A * | 5/1994 | Bates | ..................... | 429/231.95 |
| 6,432,586 B1 | 8/2002 | Zhang | | |
| 2005/0255769 A1 | 11/2005 | Henninge et al. | | |
| 2005/0266150 A1 | 12/2005 | Yong et al. | | |
| 2006/0263676 A1 * | 11/2006 | Chang et al. | ..................... | 429/74 |
| 2007/0122701 A1 * | 5/2007 | Yamaguchi | ................ | 429/218.1 |
| 2007/0269711 A1 | 11/2007 | Meguro et al. | | |
| 2008/0206651 A1 * | 8/2008 | Kawase et al. | ................ | 429/330 |
| 2008/0226981 A1 * | 9/2008 | Yoon | .............................. | 429/174 |
| 2008/0241674 A1 * | 10/2008 | Kim | .............................. | 429/164 |
| 2009/0092892 A1 * | 4/2009 | Yamaguchi et al. | .......... | 429/125 |

FOREIGN PATENT DOCUMENTS

| | | |
|---|---|---|
| JP | 8-255631 | 10/1996 |
| JP | 2001-085042 | 3/2001 |
| JP | 2002-075429 | 3/2002 |
| KR | 10-2007-0084079 A | 10/1996 |
| KR | 10-2005-0058489 A | 6/2005 |
| KR | 10-2006-0041649 A | 5/2006 |

OTHER PUBLICATIONS

English machine translation of JP 2001-085042, published Mar. 30, 2001 in the name of Kawamura et al.
English machine translation of JP 2002-075429, published Mar. 15, 2002 in the name of Sugano et al.
English machine translation of JP publication No. 8-255631, published Oct. 1, 1996 in the name of Yamamoto et al.

(Continued)

*Primary Examiner* — Mark F Huff
*Assistant Examiner* — Monique Wills
(74) *Attorney, Agent, or Firm* — Christie, Parker & Hale, LLP

(57) ABSTRACT

A cylindrical secondary battery having improved performance in a compression test and a collision test. The cylindrical battery including a ceramic layer coated on at least one of a cathode plate and an anode plate, and a center pin having a wall thickness of 0.05 to 0.1 mm, which is inserted into the center of an electrode assembly of the battery. The ceramic layer can have a thickness of 6.0 μm to 8.0 μm.

8 Claims, 2 Drawing Sheets

(56) References Cited

OTHER PUBLICATIONS

KIPO Notice of Allowance dated Aug. 31, 2010 in priority Korean application No. 10-2008-0015267, listing the cited references in this IDS., as well as U.S. Publication 2008/0206651, previously cited in the U.S. Office action dated Jun. 25, 2009 in the instant application.

* cited by examiner

CYLINDRICAL SECONDARY BATTERY

CROSS-REFERENCE TO RELATED APPLICATION

This application claims the benefit of Korean Application No. 2008-15267, filed Feb. 20, 2008, in the Korean Intellectual Property Office, the disclosure of which is incorporated herein by reference.

BACKGROUND OF THE INVENTION

1. Field of the Invention

Aspects of the present invention relate to a secondary battery, and more particularly, to a cylindrical secondary battery having improved safety performance in a compression test and a collision test.

2. Description of the Related Art

Generally, secondary batteries have been actively developed for use in lightweight portable devices, such as video cameras, cellular phones, portable computers, and the like. Secondary batteries include, for example, nickel-cadmium batteries, nickel-hydrogen batteries, nickel-zinc batteries, and lithium secondary batteries. Lithium secondary batteries have been widely used for advanced electronic devices, because they have a high capacity, a high operating voltage, and a high energy density per unit weight. A lithium secondary battery can be classified as rectangular, cylindrical, and pouch-type, according to the structure thereof.

A cylindrical secondary battery includes: an electrode assembly formed by winding a cathode plate, an anode plate, and a separator in a jelly roll-type shape; a cylindrical can to house the electrode assembly and an electrolyte; and a cap assembly to seal the cylindrical can. A cylindrical center pin is inserted into the core of the electrode assembly, to prevent the electrode assembly from being deformed by external forces. Thus, an internal electrical short of the battery is prevented.

A compression test and a collision test are performed to evaluate the safety of cylindrical secondary batteries. The compression test determines whether a short is generated, when applying pressure to upper and lower ends of a bare cell, in a vertical direction. If the center pin of the battery is compressed by the compression test, a short can occur.

The collision test determines whether a short is generated, when applying an external impact to the middle of the bare cell. If the electrode assembly of the battery is deformed against the center pin, a short can occur.

Generally, in a cylindrical secondary battery the center pin is inserted into the core of the electrode assembly, to support the electrode assembly, and to provide an electrolyte path. Results of the compression and collision tests differ, according to the thickness of the center pin. In other words, when a center pin having a wall thickness of 0.3 mm (relatively thick) is inserted into the cylindrical secondary battery, and the collision test is performed, a short does not occur. However, in the compression test, the center pin is deformed, to cause a short in the electrode assembly. When a center pin having a wall thickness of 0.1 mm (relatively thin) is inserted, a short does not occur in the compression test, but does occur in the collision test.

As described above, a battery having a thick center pin passes the collision test, but fails the compression test, because the center pin is deformed to cause the short. On the other hand, a battery having a thin center pin passes the compression test, but fails the collision test, because the center pin is deformed to cause the short.

As described above, there is a problem that a short cannot be prevented, regardless of whether the center pin is thick or thin. Thus, it is desirable that the center pin is as thin as possible, while still providing an electrolyte path, and preventing a short. In addition, as the size of the center pin is increased, the capacity of the battery is decreased.

SUMMARY OF THE INVENTION

An aspect of the present invention provides a cylindrical secondary battery having improved safety performance in compression and collision tests.

According to one aspect of the present invention, there is provided a secondary battery that includes: an electrode assembly formed by winding a cathode plate, an anode plate, and a separator interposed therebetween; a ceramic layer coated on at least one of the cathode and anode plates; a center pin inserted into the core of the electrode assembly, and having a wall thickness (t) of 0.05 to 0.1 mm; and a cylindrical can to receive the electrode assembly.

According to aspects of the present invention, the ceramic layer may have a thickness of more than 6.0 μm, for example, a thickness of 6.0 to 8.0 μm.

According to aspects of the present invention, the ceramic layer may be coated on an anode active material layer and an anode uncoated part of the anode plate.

According to aspects of the present invention, the ceramic layer may include at least one material selected from silica ($SiO_2$), alumina($Al_2O_3$), zirconium oxide($ZrO_2$), titanium oxide($TiO_2$), and mixture thereof. The ceramic layer may include at least one material selected from insulating nitrides, hydroxides, and ketones of zirconium, aluminum, silicon, or titanium, and a mixture thereof. The ceramic layer may be formed by a dipping method or a spraying method.

According to aspects of the present invention, the cylindrical can may include a cap assembly to seal an opening of the can, after the electrode assembly is inserted. The cap assembly may include a cap-up, a safety vent, a cap-down, an insulator interposed between the safety vent and cap down, and a sub-plate provided under the cap-down.

According to aspects of the present invention, the center pin may be tube-shaped and have a length corresponding to the length of the electrode assembly. The center pin may be formed of stainless steel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated, from the following description of the exemplary embodiments, taken in conjunction with the accompanying drawings, of which.

DETAILED DESCRIPTION OF THE EXEMPLARY EMBODIMENTS

Figure 1:
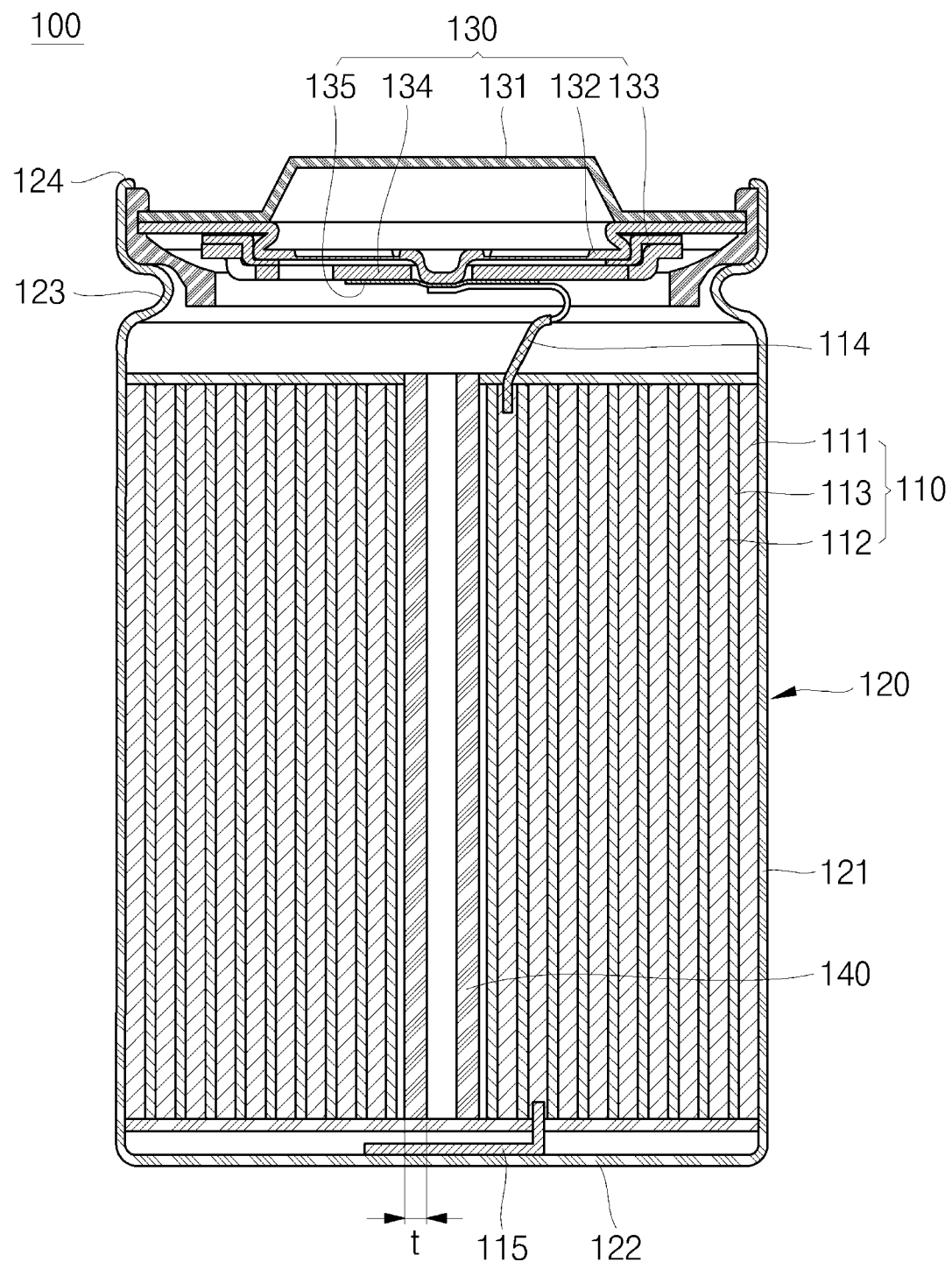
FIG. 1 is a sectional view illustrating the construction of a cylindrical secondary battery, according to one exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As referred to herein, relative terms, such as "lower" or "bottom" and "upper" or "top," may be used herein to describe one element's relationship to other elements, as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As referred to herein, when a first element is said to be disposed "on", or adjacent to, a second element, the first element can directly contact the second element, or can be separated from the second element by one or more other elements can be located therebetween. In contrast, when an element is referred to as being disposed "directly on" another element, there are no intervening elements present. As used herein, the term "and/or" includes any and all combinations of one or more of the associated listed items.

Referring to FIG. 1, a cylindrical secondary battery 100 includes: an electrode assembly 110 formed by winding together a cathode plate 111, an anode plate 112, and a separator 113 interposed therebetween; a cylindrical can 120 having an opening to receive the electrode assembly 110 and an electrolyte; a cap assembly 130 provided at the upper opening of the cylindrical can 120 to seal the cylindrical can 120, and a center pin 140 inserted into a core of the electrode assembly 110.

Figure 2:
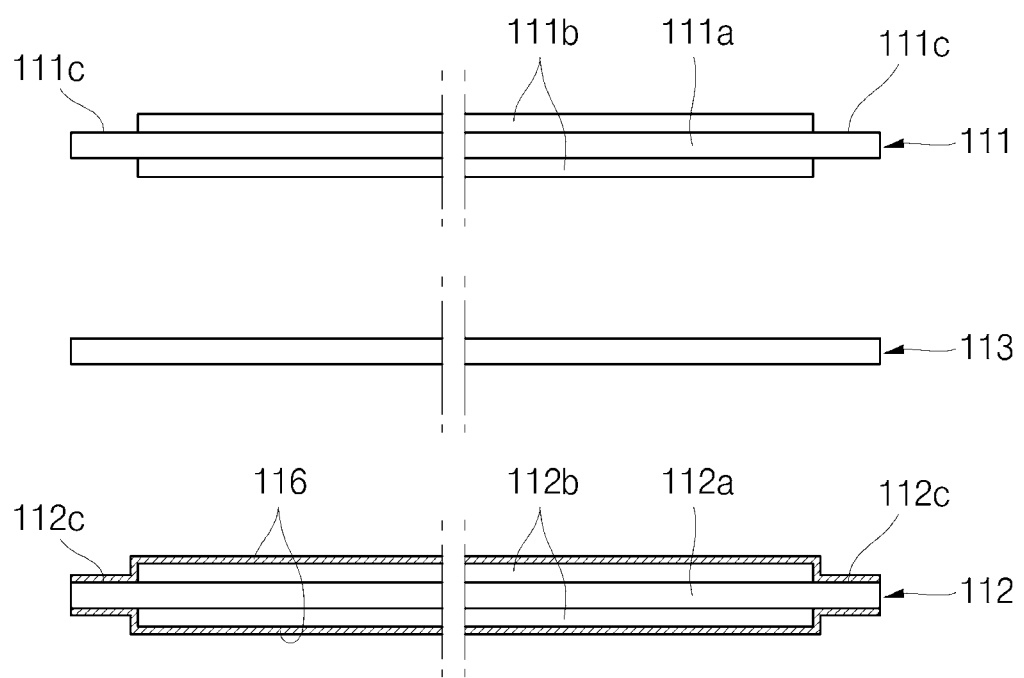
FIG. 2 is a schematic view illustrating a cathode plate, an anode plate, and a separator, according to the exemplary embodiment of the present invention.

Referring to FIG. 2, a ceramic layer 116 is formed on at least one of the cathode plate 111 and anode plate 112. In other words, when the cathode plate 111, the anode plate 112, and the separator 113 are wound in a jelly roll-type shape, the ceramic layer 116 is formed on surfaces of the cathode plate 111 and anode plate 112 that face each other, thereby insulating the cathode plate 111 from the anode plate 112. The ceramic layer 116 is shown on both surfaces of the anode plate 112 in FIG. 2, but not limited thereto. In other words, the ceramic layer 116 may be formed on both surfaces of the cathode plate 111, or may be formed on both surfaces of the cathode plate 111 and the anode plate 112, for example.

The electrode assembly 110 is formed by winding the cathode plate 111, the anode plate 112, and the separator 113 together. A cathode active material layer 111b is coated on a surface of a cathode collector 111a of the cathode plate 111, and an anode active material layer 112b is coated on a surface of an anode collector 112a of the anode plate 112. The separator 113 is interposed between the cathode plate 111 and anode plate 112, to electrically insulate them from each other. A cathode tab 114 projects from an upper part of the electrode assembly 110, to be electrically coupled to the cap assembly 130, and an anode tab 115 projects from a lower part thereof, to be electrically coupled to a bottom surface of the cylindrical can 120.

The cathode collector 111a of the cathode plate 111 is made of conductive metal, so as to collect electrons from the cathode active material layer 111b, and to provide a path to an external circuit. The cathode active material layer 111b is made by mixing a cathode active material, a conductive material, and a binder. The cathode active material layer 111b is coated at a predetermined thickness on the cathode collector 111a. The cathode active material layer 111b is not formed on end portions of the cathode collector 111a, and the end portions form the cathode uncoated part 111c. The cathode tab 114 is welded to one side of the cathode uncoated part 111c, to be electrically coupled to the cathode plate 111.

The anode collector 112a of the anode plate 112 is made of conductive metal, so as to collect electrons from the anode active material layer 112b, and to provide a path to the external circuit. The anode active material layer 112b is made by mixing an anode active material, a conductive material, and a binder. The anode active material layer 112b is coated at a predetermined thickness on the anode collector 112a. The anode active material layer 112b is not formed on end portions of the anode collector 112a, and the end portions form the anode uncoated part 112c. The anode tab 115 is welded to one side of the anode uncoated part 112c, to be electrically coupled to the anode plate 112.

The separator 113 is interposed between the cathode plate 111 and anode plate 112. The separator 113 may extend from an outer circumference surface of the electrode assembly 110. The separator 113 prevents a short between the cathode plate 111 and anode plate 112, and is made of porous polymer that is permeable to lithium ions.

The ceramic layer 116 is coated on at least one of the cathode plate 111 and anode plate 112. More particularly, the ceramic layer 116 is formed on the cathode active material layer 111b and the anode active material layer 112b. In addition, the ceramic layer 116 may be formed on the cathode and anode uncoated parts 111c and 112c.

The ceramic layer 116 is coated to a thickness of more than 6.0 μm, for example, a thickness of 6.0 to 8.0 μm. When the thickness of the ceramic layer 116 is less than 6.0 μm, a short of the electrode assembly 110 may occur during the compression test. In other words, when the center pin 140 is deformed toward the electrode assembly 110, the ceramic layer 116 is deformed along with the cathode plate 111 and the anode plate 112. Thus, the ceramic layer 116 cannot prevent a short between the cathode plate 111 and anode plate 112.

On the other hand, an experimental example was performed by coating the ceramic layer 116 to thicknesses of 6.0 to 8.0 μm, on both surfaces of the anode plate 112. When the thickness of the ceramic layer 116 was increased, the compression and collision tests were passed. The thickness of the cathode active material layer, or anode active material layer, can be decreased, in order to compensate for the increased thickness of the ceramic layer 116. In the alternative, the volume of the electrode assembly 110 can be increased, in order to compensate for the thicker ceramic layer 116. Thus, it is desirable to form the ceramic layer 116 to a proper thickness, in consideration of the size and capacity of the secondary battery.

The ceramic layer 116 contains a ceramic material and a binder. The ceramic layer 116 may be formed of at least one material selected from silica ($SiO_2$), alumina ($Al_2O_3$), zirconium oxide ($ZrO_2$), titanium oxide ($TiO_2$), and a mixture thereof. In addition, the ceramic layer 116 may be formed of at least one material selected from insulating nitrides, hydroxides, and ketones, of zirconium, aluminum, silicon, or titanium, and a mixture thereof.

The ceramic layer 116 is formed from a ceramic slurry containing a ceramic material, a binder, and a solvent, which is coated on the cathode plate 111, and/or the anode plate 112.

The ceramic layer 116 is formed by evaporating the solvent and hardening the binder, by baking the coated ceramic slurry at a predetermined temperature.

The ceramic slurry may be coated by a dipping method, or a spraying method. According to the dipping method, an electrode plate is dipped in the slurry. According to the spray method, the ceramic slurry is sprayed on an electrode plate. The dipping method is generally used when the ceramic layer 116 is relatively thick. The spray method is generally used when the ceramic layer 116 is relatively thin.

The cylindrical can 120 includes a cylindrical side plate 121, and a lower plate 122 to seal a lower part of the side plate 121, so as to form a space to receive the electrode assembly 110. An upper opening of the cylindrical can 120 is sealed, after the electrode assembly 110 is inserted. In addition, a crimp 123 is formed at an upper part of the cylindrical can 120, to secure electrode assembly 110 in the cylindrical secondary battery 100. A crimp 124 is also formed at the opening of the cylindrical can 120, to fix the cap assembly 130.

The cap assembly 130 includes a cap-up 131, a safety vent 132, and a cap-down 134. An insulator 133 is interposed between the safety vent 132 and the cap-down 134. A sub-plate 135 is provided under the cap-down 134, and the cathode tab 114 is attached to the lower surface of the sub-plate 135.

The center pin 140 is generally tube-shaped. The length of the center pin 140 corresponds to the length of the electrode assembly 110. The center pin 140 may be made of a metal having excellent corrosion resistance, such as stainless steel, but is not limited thereto. The center pin 140 is inserted into the electrode assembly 110, to support the electrode assembly 110, and to provide a path for an electrolyte, and/or gas.

The wall thickness (t) of the center pin 140 is from 0.05 to 0.1 mm. When the wall thickness (t) of the center pin 140 is less than 0.05 mm, the center pin 140 may be too weak to sufficiently support the electrode assembly 110. In addition, the center pin 140 may be bent inside the electrode assembly 110. When the wall thickness (t) of the center pin 140 is greater than 0.1 mm, the center pin 140 may be too strong. Thus, the electrode assembly 110 may be damaged by deformation of the center pin 140, during the compression test. In other words, the cathode plate 111 and anode plate 112 of the electrode assembly 110 are deformed by the deformation of the center pin 140, thereby causing a short between the cathode plate 111 and anode plate 112. The center pin 140 may pass through the cathode plate 111 and/or the anode plate 112, to cause the short.

Table 1 shows results of the compression and collision tests, according to experimental and comparative examples, in accordance with aspects of the present invention.

In Table 1, the number before "L" indicates the number of test repetitions, and L0, L1, L4, and L5 respectively indicate: "no change", "vent open (leakage occurred)", "smoke generation", and "overheating".

EXPERIMENTAL EXAMPLE 1

A ceramic layer was coated on an anode active material layer and an anode uncoated part, at a wall thickness of 6.0 µm. A center pin having a wall thickness (t) of 0.1 mm was inserted into an electrode assembly of a cylindrical secondary battery. Then, compression and collision tests were respectively performed on the cylindrical secondary battery.

In the A and B-type compression tests, compression forces of 13KN and 16.9KN were respectively applied. Ten batteries were tested in the A and B-type tests. As a result, there was no change.

In the collision tests, circular rods having thicknesses of 15.8 mm and 7.9 mm were respectively inserted into the battery, and 9.1 Kg weight was dropped onto the batteries, from a height of 61 cm. Then, the deformations were identified. In the A and B-type collision tests, the circular rods having diameters of 15.8 mm and 7.9 mm were respectively used. In the C-type test, a circular rod having a diameter of 7.9 mm was used in three batteries that are attached to each other. As a result of the A and B-type tests for the ten batteries, there was no change. As a result of the C-type tests, which were performed three times, there was no change.

EXPERIMENTAL EXAMPLE 2

A ceramic layer was formed on an anode plate in thickness of 7.3 µm, and a center pin having a wall thickness (t) of 0.05 mm was inserted into an electrode assembly of a cylindrical secondary battery. Then, the safety performance test was performed for the cylindrical secondary battery. As a result of the A and B-type compression tests, there was no change. In the collision test, leakage occurred only in the B-type test.

EXPERIMENTAL EXAMPLE 3

A ceramic layer was formed to thickness of 8.0 µm, and a center pin having a wall thickness (t) of 0.1 mm was inserted into a cylindrical secondary battery. Then, the safety performance test was performed for the cylindrical secondary battery. As a result of the A and B-type compression tests, there was no change. In the collision test, leakage occurred in both the A and B-type tests. There was no change in the C type test.

TABLE 1

|  | Thickness of ceramic layer | Thickness of center pin | Compression test (compression force) | | Collision test (diameter of circular rod)) | | |
|---|---|---|---|---|---|---|---|
|  |  |  | A (13 KN) | B (16.9 KN) | A (15.8 mm) | B (7.9 mm) | C (7.9 mm) (2P) |
| Example 1 | 6.0 µm | 0.1 mm | 10L0 | 10L0 | 10L0 | 10L0 | 3L0 |
| Example 2 | 7.3 µm | 0.05 mm | 4L0 | 4L0 | 4L0 | 2L0, 2L1 | 2L0 |
| Example 3 | 8.0 µm | 0.1 mm | 5L0 | 5L0 | 5L1 | 5L1 | 3L0 |
| Comparison example 1 | — | 0.1 mm | 2L1 | 3L1 | 2L5 | 1L4 | 1L4 |
| Comparison example 2 | — | 0.3 mm | 1L5 | 2L4 | 4L1 | 4L1 | 4L1 |

COMPARATIVE EXAMPLE 1

A center pin having a wall thickness (t) of 0.1 mm was inserted into an electrode assembly that was not coated with a ceramic layer. Then, tests were performed for the cylindrical secondary battery. As a result of the compression tests, leakage occurred in both the A and B-type tests. In the collision test, the battery was broken in the A-type test. Fire occurred in the B and C-type tests.

COMPARATIVE EXAMPLE 2

A center pin having a wall thickness (t) of 0.3 mm was inserted into an electrode assembly that was not coated with a ceramic layer. Then, tests were performed for the cylindrical secondary battery. As a result of the compression tests, the battery was broken in the A-type test, and fire occurred in the B-type test. In the collision test, the safety vent was opened, to cause leakage in the A, B and C-type tests.

As described above, the secondary battery, according to aspects of the present invention, produces the following effects. First, the internal short of the electrode assembly is prevented, when the upper or lower ends are compressed, or an impact is applied to the middle the battery, thereby improving the safety performance. Second, the insulation performance of the electrode assembly is improved, by forming the ceramic layer on the cathode or anode plate of the electrode assembly, thereby improving safety performance in the collision test. Third, the center pin inserted into the core of the electrode assembly, including the ceramic layer, can be thinner, thereby improving safety performance in the compression test.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A cylindrical secondary battery, comprising:
   a wound electrode assembly comprising a cathode plate, an anode plate, and a separator interposed between the cathode and anode plates;
   a ceramic layer coated on at least one of the cathode and anode plates, having a thickness of more than 6.0 μm, wherein the ceramic layer is in direct contact with the separator, the ceramic layer comprising at least one material selected from the group consisting of:
   silica ($SiO_2$), alumina ($Al_2O_3$), zirconium oxide ($ZrO_2$), and mixtures thereof; and
   insulating nitrides, hydroxides, and ketones, of zirconium, aluminum, silicon, or titanium, and mixtures thereof;
   a center pin inserted into the center of the electrode assembly, having a wall thickness of 0.05 mm to 0.1 mm; and
   a cylindrical can to house the electrode assembly.

2. The cylindrical secondary battery of claim 1, wherein the ceramic layer has thickness of more than 6.0 μm to 8.0 μm.

3. The cylindrical secondary battery of claim 1, wherein the ceramic layer is coated on an anode active material layer and an anode uncoated part, of the anode plate.

4. The cylindrical secondary battery of claim 1, wherein the ceramic layer is formed by a dipping method or a spraying method.

5. The cylindrical secondary battery of claim 1, further comprising a cap assembly to seal an opening of the can, the cap assembly comprising:
   a cap-up;
   a safety vent disposed below the cap-up;
   a cap-down disposed below the safety vent;
   an insulator disposed between the safety vent and cap down; and
   a sub-plate disposed below the cap-down.

6. The cylindrical secondary battery of claim 1, wherein the center pin is tube-shaped, and is at least as long as the electrode assembly.

7. The cylindrical secondary battery of claim 1, wherein the center pin is formed of stainless steel.

8. A cylindrical secondary battery, comprising:
   a wound electrode assembly comprising a cathode plate, an anode plate, and a separator interposed between the cathode and anode plates;
   a ceramic layer coated on at least one of the cathode and anode plates, having a thickness of 6.0 μm to 8.0 μm, wherein the ceramic layer is in direct contact with the separator, the ceramic layer comprising at least one material selected from the group consisting of:
   silica ($SiO_2$), alumina ($Al_2O_3$), zirconium oxide ($ZrO_2$), and mixtures thereof; and
   insulating nitrides, hydroxides, and ketones, of zirconium, aluminum, silicon, or titanium, and mixtures thereof;
   a center pin inserted into the center of the electrode assembly, having a wall thickness of 0.05 mm to 0.1 mm; and
   a cylindrical can to house the electrode assembly.

* * * * *

UNITED STATES PATENT AND TRADEMARK OFFICE
CERTIFICATE OF CORRECTION

PATENT NO. : 8,691,419 B2  Page 1 of 1
APPLICATION NO. : 12/372996
DATED : April 8, 2014
INVENTOR(S) : Myungro Lee et al.

It is certified that error appears in the above-identified patent and that said Letters Patent is hereby corrected as shown below:

On the Title Page

(56) References Cited  Delete "10/1996"
FOREIGN PATENT DOCUMENTS,  Insert -- 8/2007 --
right column, line 4

In the Claims

Column 8, Claim 2, line 10  After "has"
 Insert -- a --

Signed and Sealed this
Nineteenth Day of January, 2016

Michelle K. Lee
*Director of the United States Patent and Trademark Office*